United States Patent [19]

Mizoguchi, Haruki

[11] Patent Number: 4,660,840
[45] Date of Patent: Apr. 28, 1987

[54] NEEDLE-ROLLER TYPE CHUCK

[75] Inventor: Mizoguchi, Haruki, Ikoma, Japan

[73] Assignee: Mizoguchi Iron Works & Co., Ltd., Nara, Japan

[21] Appl. No.: 728,805

[22] Filed: Apr. 29, 1985

[30] Foreign Application Priority Data

Dec. 28, 1984 [JP] Japan .................. 59-200463[U]
Dec. 28, 1984 [JP] Japan .................. 59-200464[U]
Dec. 28, 1984 [JP] Japan .................. 59-200465[U]

[51] Int. Cl.$^4$ ............................................. B23B 31/04
[52] U.S. Cl. .................................. 279/1 N; 279/9 R; 279/103
[58] Field of Search ............... 409/232, 234; 279/1 D, 279/1 N, 9 R, 32, 103, 36, 42, 48

[56] References Cited

U.S. PATENT DOCUMENTS

| | | | |
|---|---|---|---|
| 1,765,362 | 6/1930 | Berry | 279/48 |
| 4,021,051 | 5/1977 | Toyomoto et al. | 279/1 N |
| 4,379,667 | 4/1983 | Yoshimoto et al. | 279/1 N |

FOREIGN PATENT DOCUMENTS

| | | | |
|---|---|---|---|
| 41-23987 | 12/1966 | Japan . | |
| 23894 | 10/1969 | Japan | 279/1 N |
| 57-23055 | 5/1982 | Japan . | |
| 57-33930 | 7/1982 | Japan . | |
| 15639 | 1/1983 | Japan | 279/42 |
| 58-15043 | 3/1983 | Japan . | |
| 24907 | 2/1984 | Japan | 279/1 R |
| 59-33534 | 9/1984 | Japan . | |
| 551720 | 3/1943 | United Kingdom | 279/48 |

*Primary Examiner*—Gil Weidenfeld
*Assistant Examiner*—Daniel W. Howell
*Attorney, Agent, or Firm*—Wenderoth, Lind & Ponack

[57] ABSTRACT

An improved needle-roller type chuck having a cylindrical portion extending forwardly from a chuck main body which is constituted by an inner cylinder integrally formed with a chuck main body and an outer cylinder fixed as one unit, onto the outer peripheral surface of the inner cylinder, a plurality of groove portions formed on the outer peripheral surface of the inner cylinder except for its forward end portion, in positions corresponding to the portions for attaching the needle rollers.

4 Claims, 5 Drawing Figures

NEEDLE-ROLLER TYPE CHUCK

BACKGROUND OF THE INVENTION

The present invention generally relates to a machine tool and more particularly, to a needle-roller type chuck for attaching a cutting tool or the like onto a main spindle of a machine.

Conventionally, for a needle-roller type chuck, there has been proposed, for example, in Japanese Utility Model Publication, Jitsukosho No. 41-23987, an arrangement as shown in FIGS. 1 and 2, which includes a chuck main body 1, a cylindrical portion 2 having a convergently tapered outer peripheral surface and extending forwardly (i.e. downwardly in FIG. 1) from the chuck main body 1, and a clamping nut 3 having an inner peripheral surface slightly larger in diameter than the outer peripheral surface of the cylindrical portion 2 and formed with a taper parallel to said outer peripheral surface, with said clamping nut 3 being mounted on the outer peripheral surface of said cylindrical portion 2 through a large number of needle rollers 5 rotatably supported in a retainer 4. In this arrangement, each of the needle rollers 5 is disposed in such a manner that its axis x is inclined so as not to intersect with the axis X of the chuck main body 1 for spiral revolution while rotating on the outer peripheral surface of the cylindrical portion 2 based on the rotation of the clamping nut 3, thereby to contract or restore the cylindrical portion 2 for selective attachment or detachment of a tool 6.

The known needle-roller chuck as described above, however, has various problems as follows.

(a) The cylindrical portion 2 which is subjected to a considerably large contracting force by the needle rollers 5 is required to have high rigidity and sufficient hardness, while it is also required to be provided with a large amount of deflection or flexibility in order to achieve an ample grasping capability. In other words, with respect to the cylindrical portion 2, there are involved such inconsistent problems that said cylindrical portion 2 must be thick to satisfy the former requirement, while simultaneously, it should be thin to meet the latter demand.

(b) It is necessary that the outer peripheral surface or needle roller contacting surface of the cylindrical portion 2 should have a hardness higher than HRC 60 from the viewpoint of durability. Meanwhile, at a shank portion 1a of the chuck main body 1, its surface hardness must be lower than that of the machine main spindle for the protection of said main spindle, and since such machine main spindle generally has a hardness at HRC 60, the shank portion 1a is required to have a hardness at approximately HRC 55 or thereabout. However, heat-treatment of the same item to have different hardnesses requires extremely complicated and troublesome steps, even though it is technically possible, thus not being suitable for practical applications.

Incidentally, the problems related to the above item (a) may be solved anyhow by forming a large number of slit-like axial grooves in the inner peripheral surface of the cylindrical portion 2 as disclosed, for example, in Japanese Utility Model Publications Jitsukosho Nos. 57-23055 and 58-15043, or by forming many axial deep holes in the cylindrical portion 2 from its forward end face as in Japanese Utility Model Publication Jitsukosho No. 57-33930. However, since both of these grooves and deep holes as described above are formed up to the forward end portion of the cylindrical portion 2 on which most of the stress is concentrated, upon grasping the tool 6 thereby, there are disadvantages in that not only the grasping force is lowered at such forward end portion, but also the so-called "collapsing deformation" is formed on the inner peripheral surface of the forward end portion (FIG. 1), thus resulting in an off-center vibration of the tool 6. Moreover, due to the fact that the grooves and deep holes as described above are open towards the inner peripheral surface or forward end portion of the cylindrical portion 2, chips, dust and dirt, cutting oils, etc. undesirably enter through such open portions, and removal thereof is extremely troublesome.

On the other hand, the problems relating to item (b) may also be solved by arranging the cylindrical portion 2 into a double wall construction, with its outer cylindrical portion contacting the needle rollers 5 being adapted to be detachable with respect to the chuck main body 1 as disclosed, for example, in Japanese Utility Model Publication Jitsukosho 59-33534. However, if the outer cylindrical portion is arranged to be detachable (e.g. fixing by set screws), there is a problem in that the deterioration in the setting or joint strength and the fixing accuracy between the outer cylindrical portion and the chuck main body 1 is inevitable.

In other words, up to the present, there have been proposed no needle-roller type chucks in which the problems in items (a) and (b) as stated so far, are solved without presenting any other new problems.

SUMMARY OF THE INVENTION

Accordingly, an essential object of the present invention is to provide an improved needle-roller type chuck which is capable of holding a tool with a sufficient grasping force at a high accuracy without giving rise to any off-center vibration, and is free from entry of chips, dust and dirt, cutting oils, etc. thereinto.

Another important object of the present invention is to provide a needle-roller type chuck as referred to above, which is simple in construction and stable in functioning at a high reliability, and can be easily manufactured on a large scale at low cost.

In accomplishing these and other objects, according to one preferred embodiment of the present invention, there is provided a needle-roller type chuck including a chuck main body, a cylindrical portion having a convergently tapered outer peripheral surface and extending forwardly from the chuck main body, and a clamping nut having an inner peripheral surface slightly larger in diameter than the outer peripheral surface of the cylindrical portion and formed with a tapered portion parallel to the outer peripheral surface, with the clamping nut being mounted on the outer peripheral surface of the cylindrical portion through a large number of needle rollers rotatably supported in a retainer through clamping by the clamping nut, and characterized in that the cylindrical portion is consituted by an inner cylinder integrally formed with the chuck main body and an outer cylinder fixed as one unit onto the outer peripheral surface of the inner cylinder, and a plurality of groove portions formed on the outer peripheral surface of the inner cylinder except for the forward end portion thereof, in position corresponding to the needle roller attaching portion.

By the arrangement according to the present invention as described above, an improved needle-roller type chuck is provided with a simple construction.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 2:
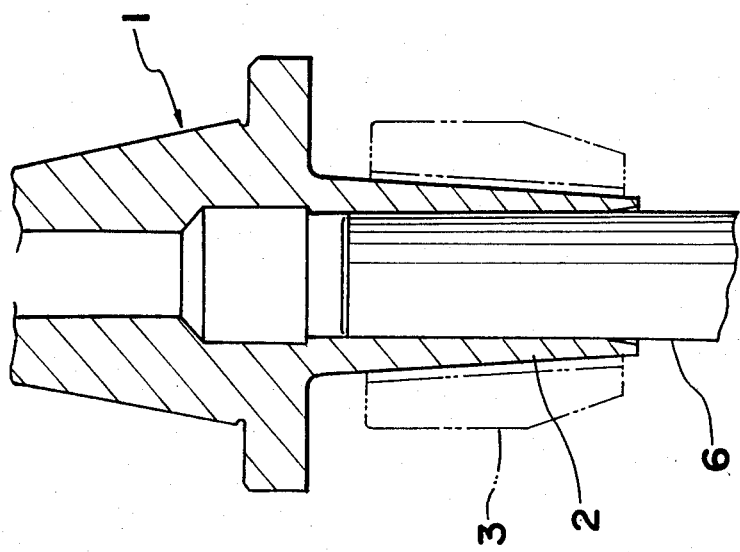
FIGS. 1 and 2 are cross sectional views showing construction of an essential portion of a conventional needle-roller type chuck (already referred to)

Before the description of the present invention proceeds, it is to be noted that like parts are designated by like reference numerals throughout the accompanying drawings.

Figure 3:
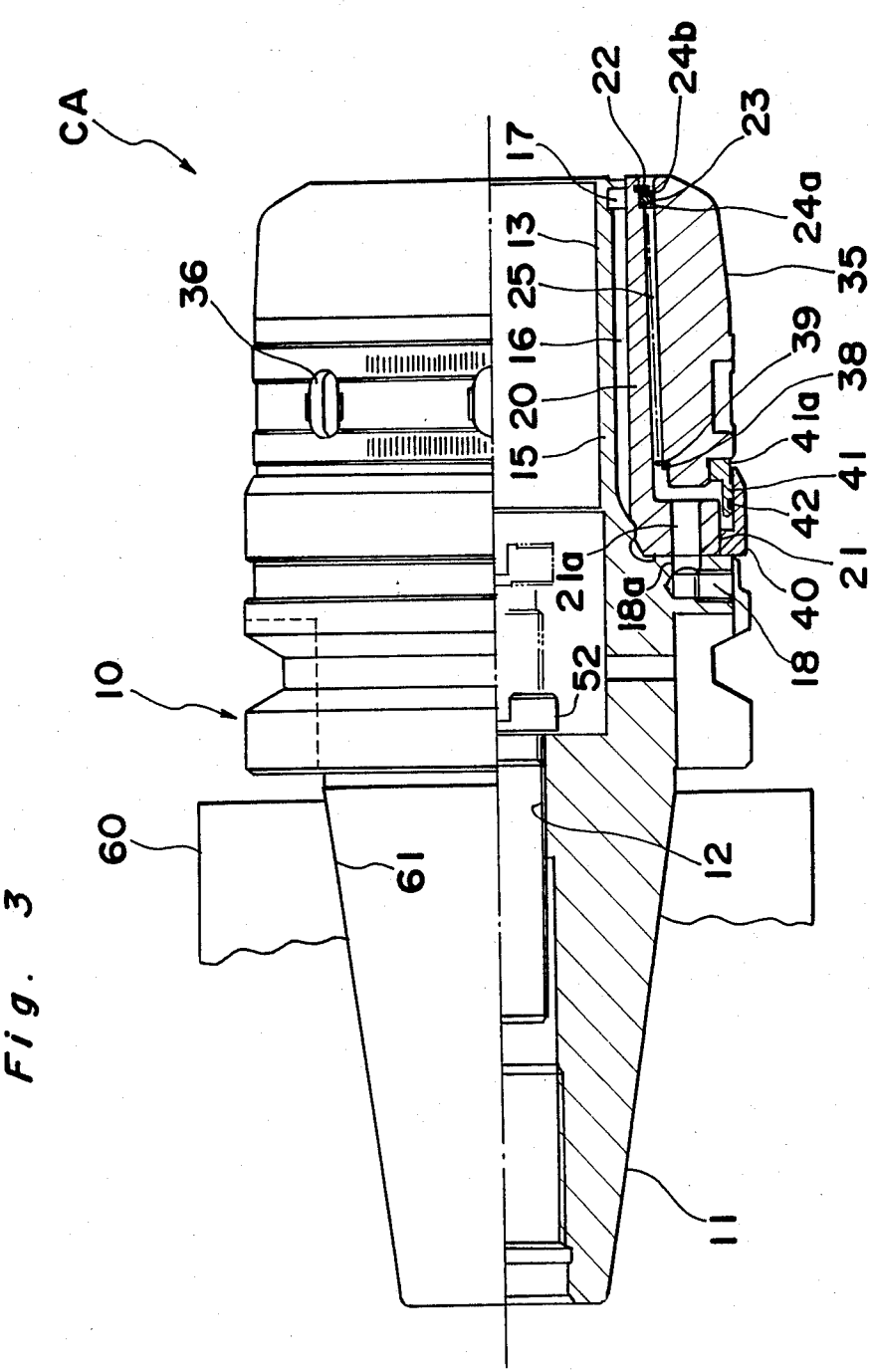
FIG. 3 is a side elevational view, partly in section, showing construction of an improved needle-roller type chuck according to one preferred embodiment of the present invention.
Figure 4:
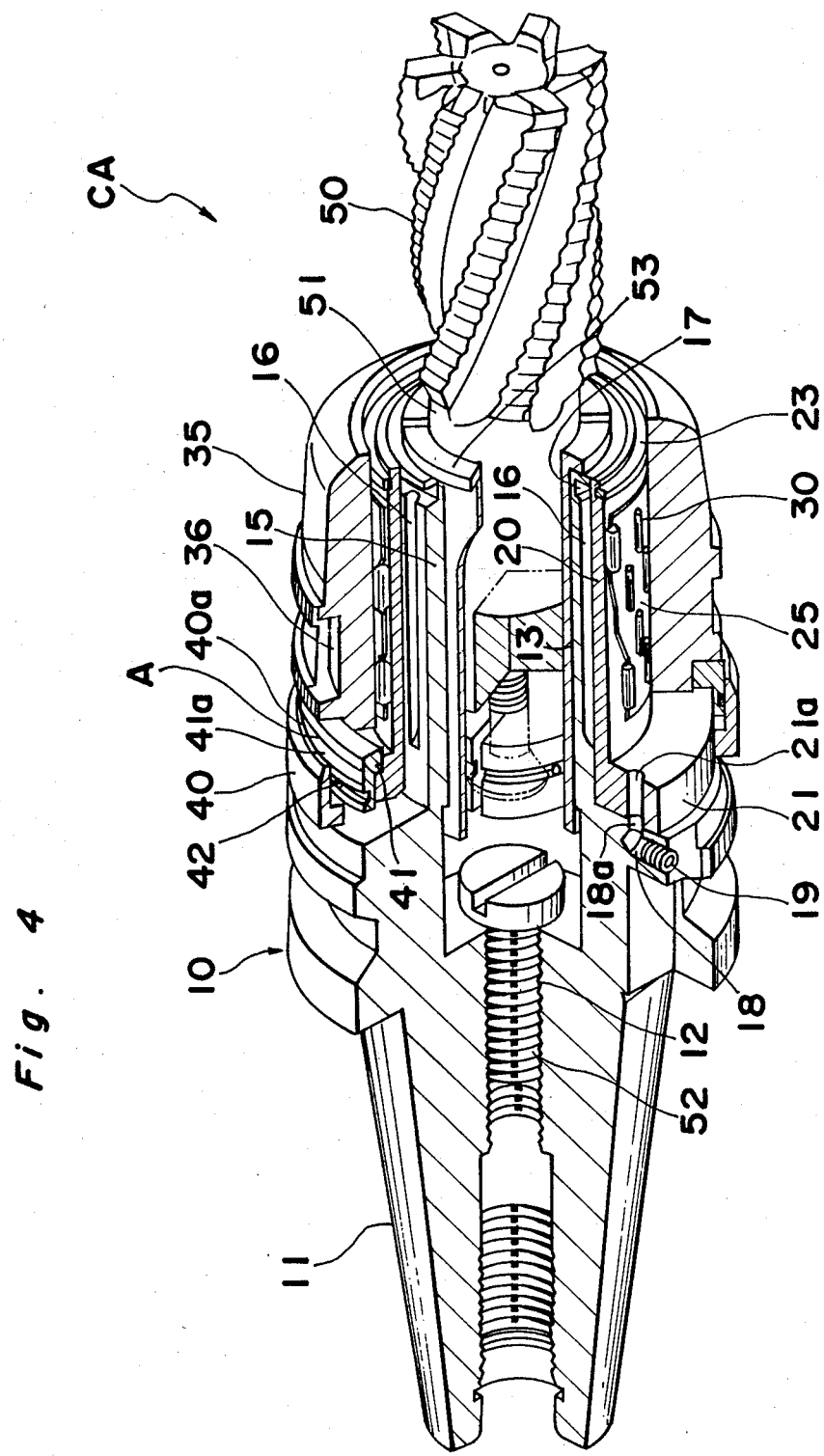
FIG. 4 is a perspective view, partly broken away, of the needle-roller type chuck in FIG. 3.

Referring now to the drawings, there is shown in FIGS. 3 and 4, a needle-roller type chuck CA according to one preferred embodiment of the present invention, which generally includes a chuck main body 10, an inner cylinder 15 extending forwardly (i.e., to the right in FIGS. 3 and 4) from the chuck main body 10, an outer cylinder 20 fixed on the outer peripheral surface of the inner cylinder 15, needle rollers 30 supported in a retainer 25 rotatably mounted on the outer peripheral surface of the outer cylinder 20, a clamping nut 35 mounted over the outer peripheral surface of said outer cylinder 20 around said needle rollers 30, and collar members 40 and 41, with the cylindrical portion for a chucking section being constituted by the inner cylinder 15 and the outer cylinder 20.

The chuck main body 10 is integrally formed with a shank portion 11 at its rear portion and the inner cylinder 15 at its forward portion as described above, while said inner cylinder 15 is formed, on its outer peripheral surface, with a plurality of grooves 16 axially directed at equal intervals. These grooves 16 extend over a length corresponding to the attaching portion or space for the needle rollers 30, while forward ends of the grooves 16 are closed without opening into the forward end face or axial end surface of the inner cylinder 15 thus terminate short of the continuous unbroken end surface of the inner cylinder, and communicated with each other by an annular groove 17 as illustrated.

The outer cylinder 20 made of, for example, chromium-molybdenum steel, bearing steel and the like, has a flange portion 21, and is formed, at its outer peripheral surface, into a convergently tapered configuration. This outer cylinder 20 is rigidly fixed to the chuck main body 10 into one unit by being fitted onto the outer peripheral surface of the inner cylinder 15, for example, through a shrinkage fit.

Meanwhile, the retainer 25 is a cylindrical member with a thin wall thickness having a taper parallel to the outer peripheral surface of the inner cylinder 15, and is rotatably mounted on the outer peripheral surface of the outer cylinder 20. The needle rollers 30 are rotatably accommodated, one by one, in groove portions of the retainer 25, in such a manner that an axis of each roller 30 itself is inclined so as not to intersect with the axis of the chuck main body 10.

The clamping nut 35 is provided with an inner peripheral surface slightly larger in diameter than the outer peripheral surface of the outer cylinder 20 and having a taper parallel to said outer peripheral surface, and is rotatably mounted over the outer peripheral surface of said outer cylinder 20 through the needle rollers 30.

The retainer 25 is prevented from disengagement by a retaining ring 22 provided at the forward end of the outer peripheral surface of the outer cylinder 20 through a rubber seal member 23 and spacers 24a and 24b, while the clamping nut 35 is also prevented from disengagement by the contact of a retaining ring 38 provided at a rear end portion in its inner peripheral surface, with the corresponding rear end of the retainer 25 through a spacer 39. More specifically, the forward end portions of the outer cylinder 20 and the clamping nut 35 are sealed by the rubber seal member 23, with the inner peripheral surface of the clamping nut 35 being arranged to be axially slidable over the rubber seal member 23.

The collar member 40 in an annular configuration made of a metallic or resin material is fixed by fitting (or by bonding, if required) onto the outer peripheral surface of the flange portion 21 of the outer cylinder 20, while the other collar member 41 similarly in an annular shape made of a metallic or resin material is secured by fitting (or by bonding, if required) onto the outer peripheral surface rear end stepped portion of the clamping nut 35. The collar member 40 and 41 are arranged to be axially slidable with respect to each other at the inner and outer peripheral surfaces thereof, with the sliding portion being sealed by an O-ring 42 attached to the collar member 41. Meanwhile, the outer peripheral surface 41a of the collar member 41 is axially classified into different colors by circumferential lines A as shown FIG. 4. More specifically, the collar member 41 is displaced following the movement of the clamping nut 35 in the axial direction (i.e., attaching or detaching operation of the tool to be described later), and through visual examination of the extent of covering of the colored outer peripheral surface 41a by the edge 40a of the collar member 40, the degree of clamping may be ensured.

Moreover, a threaded bore 18 formed in the outer peripheral surface of the chuck main body 10 is communicated the needle-roller attaching portion between the outer cylinder 20 and the clamping nut 35, through a bore 18a and another bore 21a formed in the flange portion 21 of the outer cylinder 20. The above threaded bore 18 is intended to fill grease into the needle-roller attaching space or portion, and is normally closed by a set screw 19. For filling grease, a grease nipple (not shown) is inserted into the threaded bore 18 from which the set screw 19 has been removed to inject grease therethrough. The needle-roller attaching portion is sealed by the rubber seal member 23 and the O-ring 42 as described earlier. It is to be noted here that if the needle-roller attaching portion is perfectly sealed during the grease injection, it is impossible to fill the grease, and therefore, another thread bore (not particularly shown) which is communicated with the needle-roller attaching portion, is formed at a position symmetrical (180°) with that for the threaded bore 18, so as to be opened during the filling of grease, although it is closed during other periods.

The needle-roller type chuck according to the present invention having the construction as described so far is mounted on a machine by inserting the shank portion 11 of the chuck main body 10 thereof into a central bore 61 of a machine main spindle 60 (FIG. 3). Depending on necessity, an adjusting screw 52 is engaged with a threaded portion 12, while a shank portion 51 of the tool 50 is inserted into the central bore 13 through a straight collet 53. Subsequently, upon rotation of the clamping nut 35, the needle rollers 30 are spirally revolved while being rotated so as to be displaced rearwardly together with the clamping nut 35, while the outer cylinder 20 and the inner cylinder 15 contract inwardly for grasping the tool 50 via the straight collet 53. It should be noted here that FIGS. 3 and 4 show the above grasping state.

For detachment of the tool 50, the clamping nut 35 may be rotated in the opposite direction.

The rotation of the clamping nut 35 is effected by engaging projections of an spanner or suitable wrench (not shown) with corresponding recesses 36 of said clamping nut 35.

Figure 5:
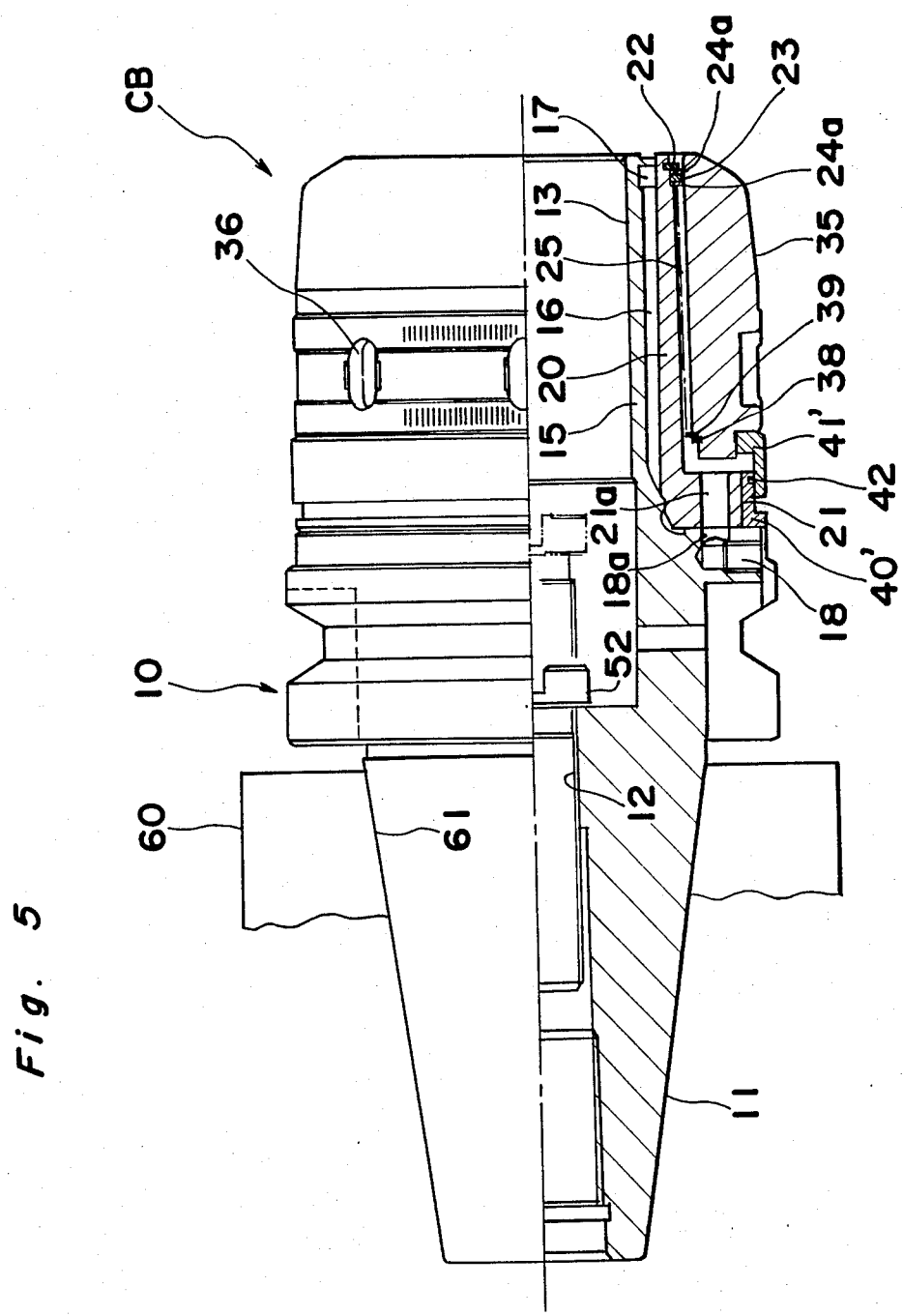
FIG. 5 is a view similar to FIG. 3, which particularly shows a modification thereof.

Referring further to FIG. 5, there is shown a modification of the needle-roller type chuck CA of FIGS. 3 and 4. In the modified needle-roller type chuck CB of FIG. 5, the positions for the collar members 40 and 41 are reversed as indicated at 40' and 41', with the collar member 40' being integrally formed with the outer cylinder 20. Since other constructions and functions of the modified chuck CB of FIG. 5 are generally similar to those of the chuck CA of FIGS. 3 and 4, detailed description thereof is abbreviated here for brevity, with like parts of the chuck CA being designated by like reference numerals.

It should be noted here that the needle-roller type chuck according to the present invention is not limited in its application to the foregoing embodiments alone, but may be further modified in various ways within the scope of the invention. For example, the O-ring 42 may be modified to be provided on the inner peripheral surface of the collar member 40, and the classification by colors for the index marks may be replaced by scale marks, etc.

It should also be noted that the inner cylinder 15 and the outer cylinder 20 may be arranged to be integrally formed with the chuck main body 10. However, if these cylinders are divided into two portions as in the embodiment of FIGS. 3 and 4, it becomes possible to differentiate the material and hardness for the outer cylinder 20 from those of the chuck main body for the improvement of durability of the chuck itself.

As is clear from the foregoing description, according to one aspect of the present invention, since the cylindrical member of the chuck main body is constituted by the inner and outer cylinders, it is possible to prepare only the outer cylinder directly subjected to the compression force of the needle rollers, from a material having a large hardness different from the chuck main body or to treat the outer cylinder to have a surface hardness larger than that of the chuck main body. Moreover, owing to the construction that the outer cylinder is fixed as one unit, onto the outer peripheral surface of the inner cylinder integrally formed with the chuck main body, rigid securing is achieved, without any looseness or adverse effect to machining accuracy.

Moreover, the groove portions corresponding to the needle-roller attaching portion formed on the outer peripheral surface of the inner cylinder, impart a proper flexibility to the thick cylindrical member formed by the inner and outer cylinders for a sufficient grasping capability. Furthermore, since the above groove portions are formed except for the forward end portion of the inner cylinder, a sufficient rigidity can be obtained at the inner cylinder forward end portion where the most stress is concentrated when a tool is grasped, without generation of the "collapsing deformation", and there is no possibility of giving rise to the "off-center vibration" of the tool.

In another aspect of the present invention, since it is so arranged that the index marks axially provided on the outer peripheral surface of the collar member located at the inner side of the collar member fixed to the chuck main body and the collar member secured to the rear portion of the clamping nut may be read off at the edge portion of the collar member located at the outer side as a reference, the state of clamping by the clamping nut can be clearly ensured, whereby loss of time due to excessive clamping or quick abrasion of the chucking cylindrical member, clamping nut, needle rollers, etc. may be effectively prevented. Furthermore, it is possible to find the degree of abrasion of the members through a comparative sensing of torques of the clamping nut by a predetermined index position as the reference position.

Figure 1:
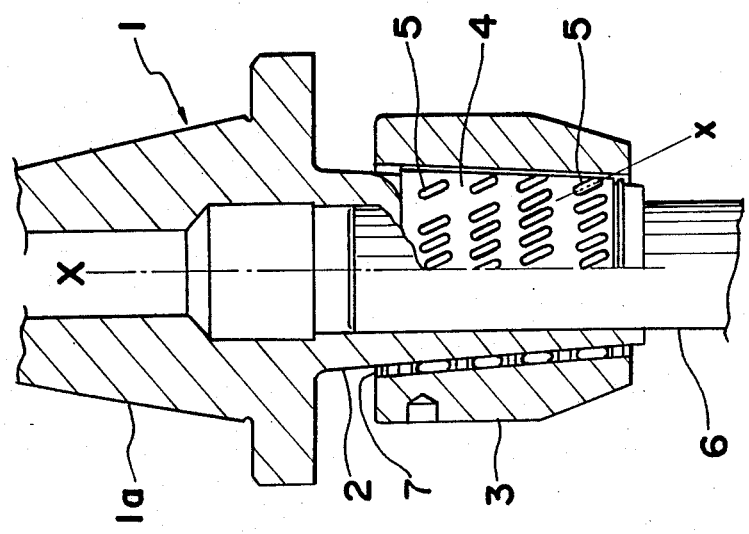

On the other hand, the two collar members as described earlier also function as a cover member for the rear end portion (as at 7 in FIG. 1) of the clamping nut, which is conventionally left as it is with a gap, thus preventing chips, dust and dirt, cutting oils, etc. from entering the needle-roller attaching portion. Moreover, when the seal member such as the O-ring 42 and the like is interposed between the collar members 40 and 41 as in the foregoing embodiments, the sealing effect becomes perfect, and there is no possibility that grease may leak out of the needle-roller attaching portion, even when the grease is filled up thereinto.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a needle-roller type chuck which comprises a chuck main body, a cylindrical portion having a convergently tapered outer peripheral surface and extending away from the chuck main body in an axial direction, and a clamping nut having an inner peripheral surface slightly larger in diameter than the other peripheral surface of said cylindrical portion and formed with a tapered portion parallel to said outer peripheral surface of said cylindrical portion, with said clamping nut being mounted on the outer peripheral surface of said cylindrical portion with a large number of needle rollers positioned in a retainer rotatably supported therebetween in a needle-roller attaching space, wherein the improvement comprises said cylindrical portion including an inner cylinder and an outer cylinder, said inner cylinder integrally formed with said chuck main body at one end thereof and having a tapered outer peripheral surface which terminates in a continuous unbroken axial end surface at the other end thereof, said outer cylinder being fixedly held on said outer peripheral surface of said inner cylinder, said inner cylinder having a plurality of groove portions formed on the outer peripheral surface of said inner cylinder, said groove portions extending in said axial direction short of said axial end surface of said inner cylinder and said groove portions extending at least along said needle roller attaching space.

2. A needle-roller type chuck as claimed in claim 1, further comprising a first annular collar member fixed to said outer cylinder and a second annular collar member secured to a portion of said clamping nut, said first and second annular collar members being overlapped with each other, the radially innermost annular collar member having index marks axially fixed on the outer peripheral surface thereof, the radially outermost annular collar member having an axial end surface positioned over said index marks for use in determining the clamping position of said clamping nut on said outer cylinder.

3. A needle-roller type chuck as claimed in claim 2, wherein said outer cylinder is integrally formed with said first annular collar member.

4. A needle-roller type chuck as claimed in claim 1, further comprising a first annular collar member fixed to said outer cylinder and a second annular collar member secured to a portion of said clamping nut, said first and second annular collar members being overlapped with each other so as to be slidable in a circumferential direction and in said axial direction, a first seal member resiliently fitted between said first and second annular collar members at one end of said needle roller attaching space and a second seal member resiliently fitted at the other end of said needle-roller attaching space between said outer cylinder and said clamping nut for sealing of the needle-roller attaching space, and a grease filling bore formed in said chuck main body and in fluid communication with said needle-roller attaching space.

* * * * *